(12) United States Patent
Hirman

(10) Patent No.: US 11,142,876 B2
(45) Date of Patent: Oct. 12, 2021

(54) ARTICULATING CONVEYOR SUPPORT FOR A COLD PLANER

(71) Applicant: Caterpillar Paving Products Inc., Brooklyn Park, MN (US)

(72) Inventor: Colton J. Hirman, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 7 days.

(21) Appl. No.: 16/670,849

(22) Filed: Oct. 31, 2019

(65) Prior Publication Data
US 2021/0131046 A1  May 6, 2021

(51) Int. Cl.
*B65G 41/00* (2006.01)
*E01C 23/088* (2006.01)
*E01C 23/12* (2006.01)

(52) U.S. Cl.
CPC .......... *E01C 23/088* (2013.01); *B65G 41/001* (2013.01); *E01C 23/127* (2013.01)

(58) Field of Classification Search
CPC ........ E01C 23/088; E01C 23/09; E01C 23/12; B65G 15/22; B65G 41/001; B65G 41/002

USPC ......................................................... 198/314
See application file for complete search history.

(56) References Cited

U.S. PATENT DOCUMENTS

| | | | |
|---|---|---|---|
| 2,525,006 A * | 10/1950 | Von Doehren | B65G 41/002 198/316.1 |
| 4,325,580 A | 4/1982 | Swisher et al. | |
| 10,190,270 B2 | 1/2019 | Hirman | |
| 2014/0183003 A1 * | 7/2014 | Jorgensen | B65G 41/002 198/602 |

FOREIGN PATENT DOCUMENTS

| DE | 102013009361 | 12/2014 |
|---|---|---|
| DE | 102014011878 | 11/2016 |

* cited by examiner

*Primary Examiner* — Sunil Singh
(74) *Attorney, Agent, or Firm* — von Briesen & Roper, s.c.; Jeff A. Greene

(57) ABSTRACT

A conveyor articulation joint for a planer machine is disclosed. The conveyor articulation joint includes a support member affixed to a machine attachment point, a pivot member having a conveyor attachment point, a joint connecting the support member and the pivot member, and an actuator configured to rotate the pivot member about the joint.

19 Claims, 5 Drawing Sheets

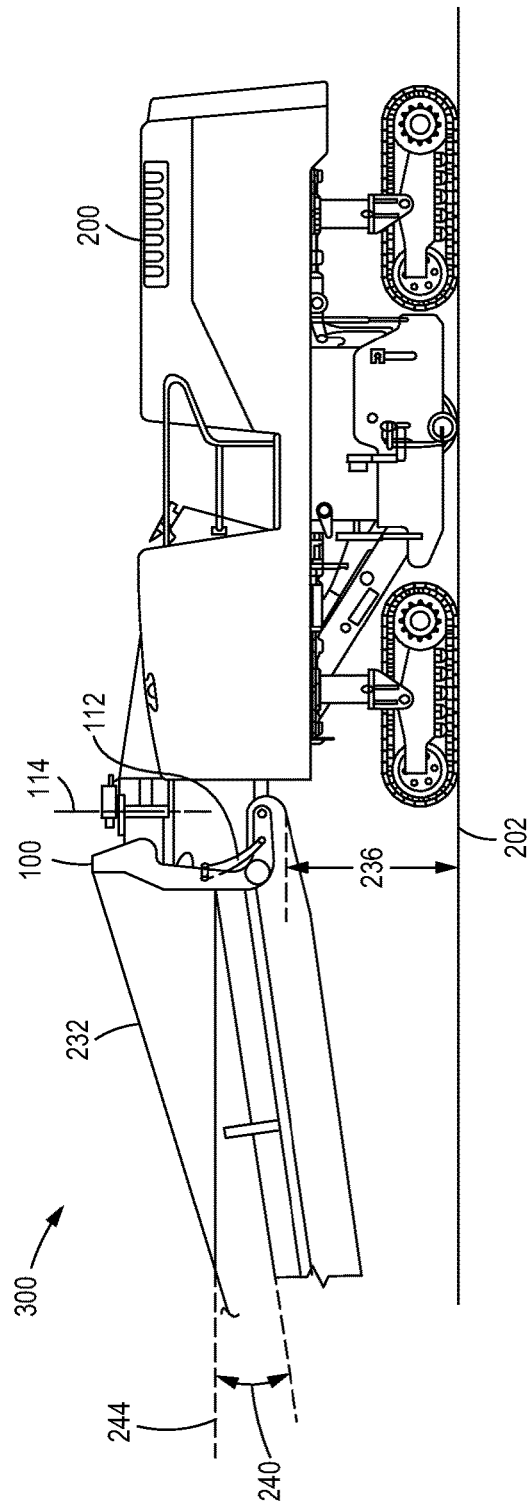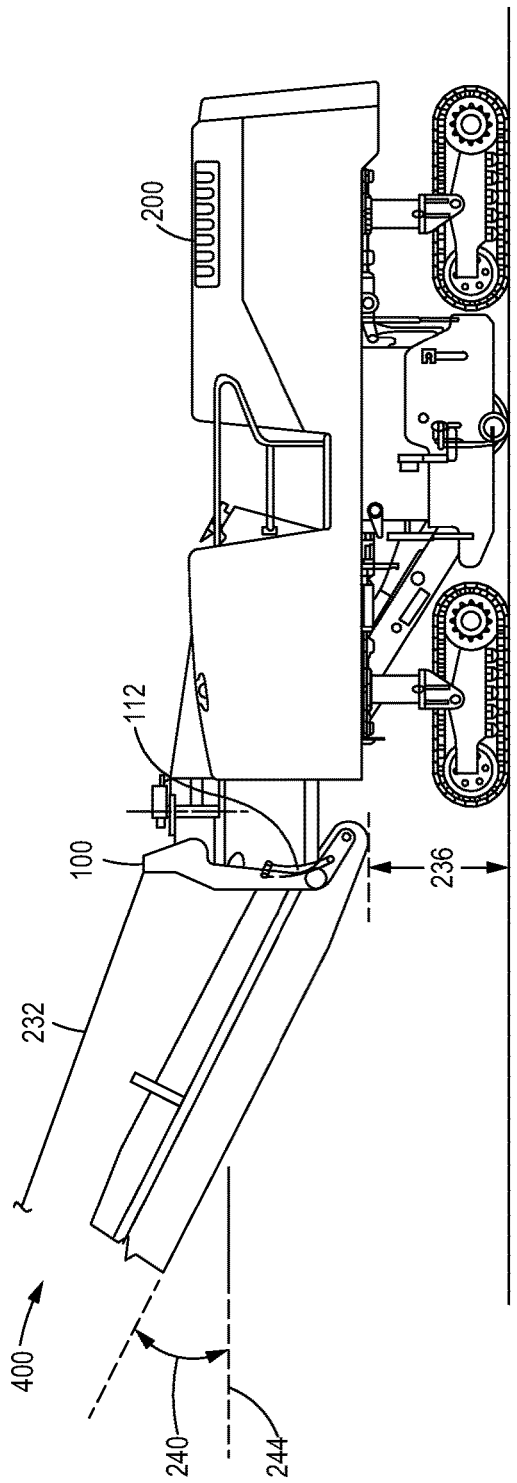

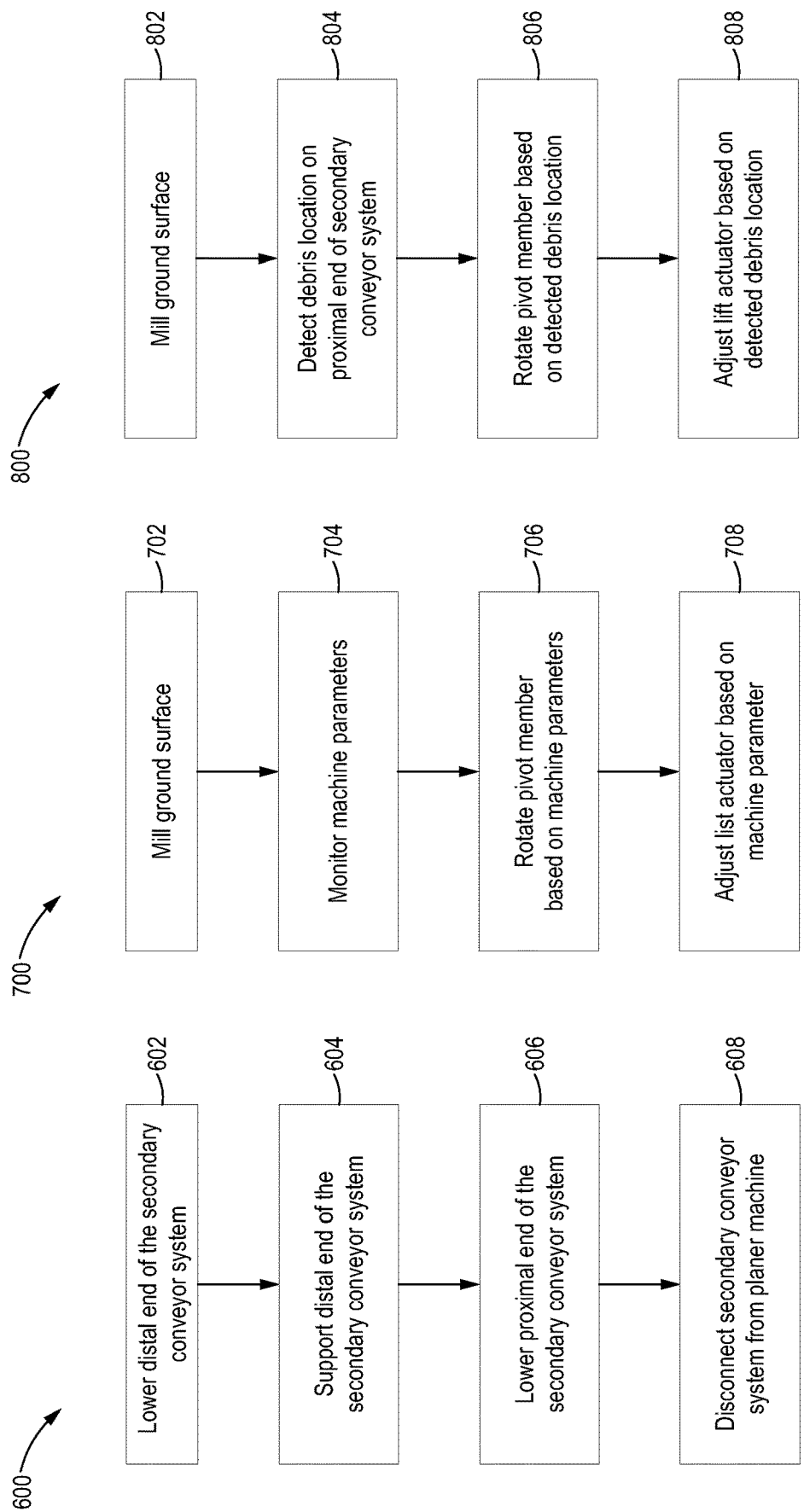

ARTICULATING CONVEYOR SUPPORT FOR A COLD PLANER

TECHNICAL FIELD

The present disclosure generally relates to cold planer machines, and more particularly relates to a conveyor articulation joint for a conveyor support system and methods for operating a cold planer machine having the conveyor articulation joint.

BACKGROUND

A planer machine, such as a cold planer, is typically employed to break up or remove a surface from a paved area. The cold planer, also referred to as a road mill, typically includes a milling system. The milling system includes a planing or milling drum having a plurality of teeth. The milling system draws power from an engine through a suitable interface to rotate the milling drum in a cutting chamber (milling chamber) to perform milling operations on the surface of the paved area. The surface of the paved area breaks apart due to rotation of the milling drum against (and its teeth digging into and tearing apart) the surface. The rotation of the milling drum can also deposit material from the broken up surface on a primary conveyor system. The primary conveyor system transfers the material to a secondary conveyor system, which in-turn can transport the material to a nearby haul vehicle.

During milling operations, it may become desirable to adjust the position of the secondary conveyor system with relation to the primary conveyor system. Further, it may also become necessary to disengage the secondary conveyor system from the planer machine.

U.S. Pat. No. 10,190,270 B2, hereinafter the '270 patent, describes a slewing assembly for providing a rotational movement of a loading conveyor that is pivotally supported on a cold planer machine. The '270 patent discloses a slewing assembly that includes a shaft pin disposed about a vertical axis that pivotally connects the frame-side structure and the conveyor-side structure. According to the '270 patent, a goal of the '270 patent is to provide a cold planer with a rotational movement of a loading conveyor that is pivotally supported on a frame thereof.

SUMMARY OF THE DISCLOSURE

In an aspect of the present disclosure, a conveyor articulation joint includes a support member affixed to a machine attachment point, a pivot member having a conveyor attachment point, a joint connecting the support member and the pivot member, and an actuator configured to rotate the pivot member about the joint.

In another embodiment, a planer machine is disclosed. The planer machine includes a primary conveyor system to receive debris from a planing drum, a secondary conveyor system to receive, at a proximal end, the debris from the primary conveyor system and to discharge the debris from a distal end, and a conveyor articulation joint to support the proximal end of the secondary conveyor system. The conveyor articulation joint includes a support member attached to a frame of the planer machine at a machine attachment point, a pivot member attached to the secondary conveyor system at a conveyor attachment point, a joint connecting the support member and the pivot member, and an actuator configured to rotate the pivot member about the joint to change a vertical position of the proximal end of the secondary conveyor system.

In another aspect of the present disclosure, a method of detaching a secondary conveyor system for a cold planer machine is disclosed. The method includes supporting a distal end of the secondary conveyor system, lowering a proximal end of the secondary conveyor system by a conveyor articulation joint, the conveyor articulation joint having a support member, a pivot member, a joint connecting the support member and the pivot member, and an actuator, wherein the lowering is based at least in part on the actuator causing the pivot member to rotate about the joint, and disconnecting the secondary conveyor system from the planer machine.

Other features and aspects of this disclosure will be apparent from the following description and the accompanying drawings.

BRIEF DESCRIPTION OF THE DRAWINGS

FIG. 3 is a second side view of a planer machine having the conveyor articulation joint of FIG. 1;

FIG. 4 is a third side view of a plan machine having the conveyor articulation joint of FIG. 1;

FIG. 6 is a flowchart of a first method of disconnecting a secondary conveyor system from a planer machine, according to one or more embodiments of the present disclosure;

FIG. 7 is a flowchart of a second method of operating a planer machine with a conveyor articulation joint, according to one or more embodiments of the present disclosure; and FIG. 8 is a flowchart of a third method of operating a planer machine with a conveyor articulation joint, according to one or more embodiments of the present disclosure.

DETAILED DESCRIPTION

Figure 1:
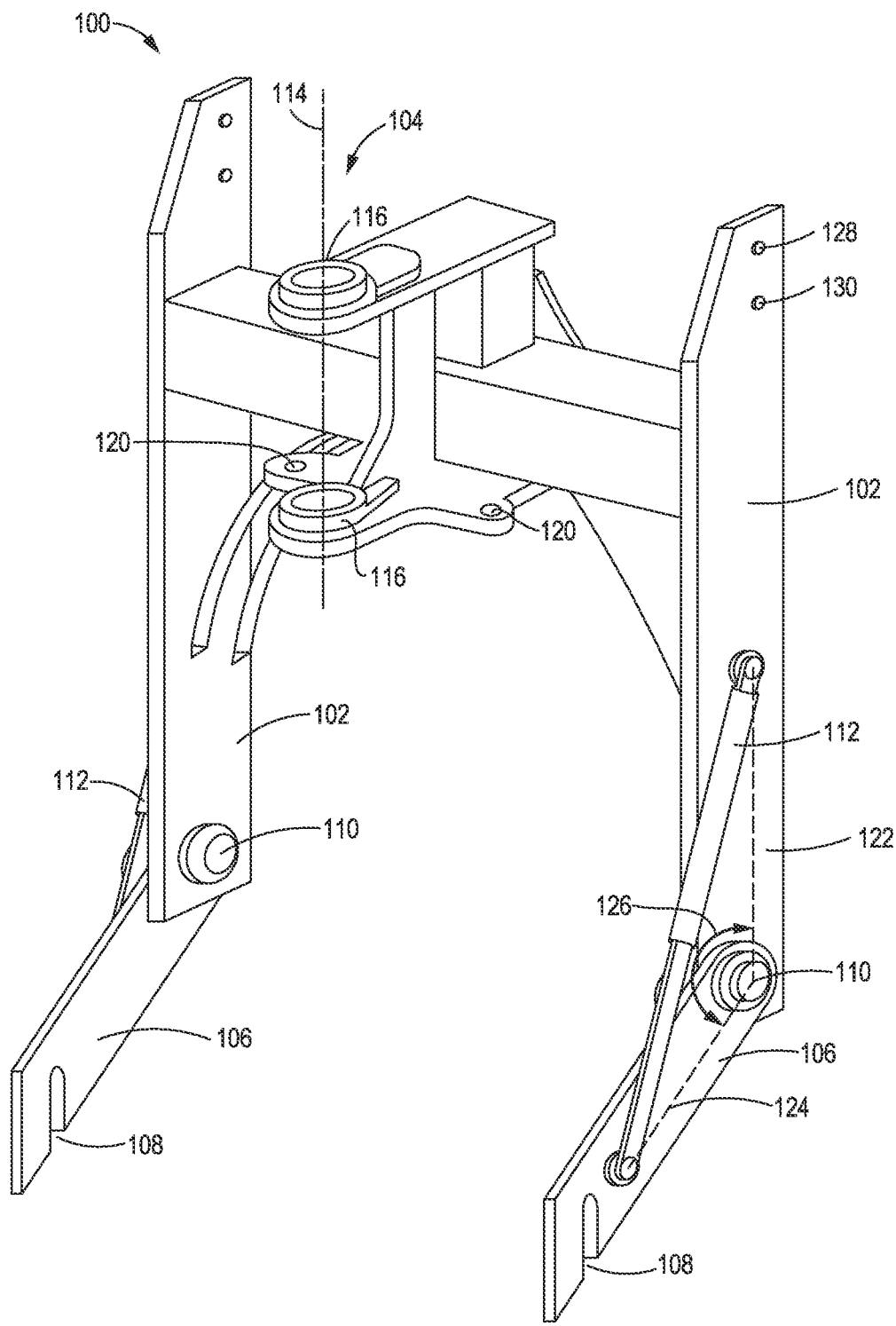
FIG. 1 is a perspective view of a conveyor articulation joint, according to one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, the same reference numbers will be used throughout the drawings to refer to the same or the like parts, FIG. 1 is a perspective view of a conveyor articulation joint, according to one or more embodiments of the present disclosure. In particular, FIG. 1 depicts the conveyor articulation joint 100 that includes a support member 102, a pivot member 106, a joint 110, and an actuator 112. The support member 102 generally extends along the support-member axis 122 and is affixed to a machine attachment point 104. As depicted in FIG. 1, a left-side support member 102 and a right-side support member 102 are affixed to the machine attachment point 104 via a crossbar 118.

Figure 2:
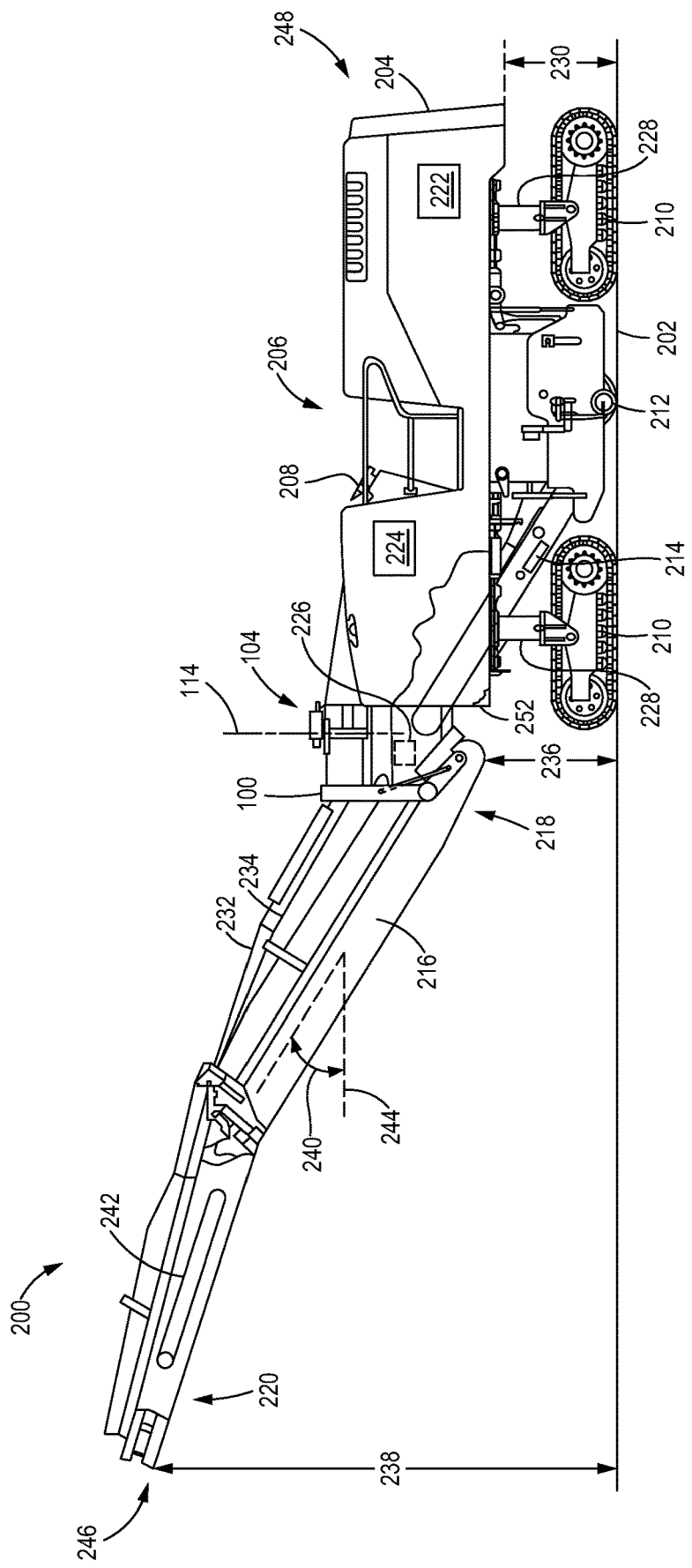
FIG. 2 is a first side view of a planer machine having the conveyor articulation joint of FIG. 1.

The machine attachment point 104 is configured to attach to a machine, such as a planer machine or a cold planer. The machine attachment point 104 may be realized as a pair of concentric through holes 116 that extend along a vertical axis 114. The conveyor articulation joint 100 is able to rotate about the vertical axis 114 to rotate a conveyor relative to the machine to which it is attached. The rotation of the conveyor articulation joint 100 may be realized by exerting forces on the conveyor rotation attachment points disposed on opposite sides of the vertical axis 114. Further, the machine attachment point 104 is configured to maintain the support member 102 at a fixed angle with respect to an upright surface (e.g., the upright surface 252 of FIG. 2) of a machine when the conveyor articulation joint is attached to the machine. In FIG. 2, the support member 102 is depicted as being substantially parallel with the upright surface 252, although certainly other configurations may exist. For example, in one embodiment, the support member 102 may be approximately ten degrees out of parallel, either tilted towards or away from the upright surface 252. In yet other embodiments, the support ember 102 may be approximately twenty, twenty-five, or thirty degrees out of parallel with respect to the upright surface 252.

The pivot member 106 includes a conveyor attachment point 108. A conveyor system, such as a cold planer machine secondary conveyor, may be attached to the conveyor articulation joint 100 via the conveyor attachment point 108. In some embodiments, the conveyor attachment point 108 is configured to receive a quick disconnect attachment mechanism. Such a quick disconnect attachment mechanism may be able to be operated by a hand of an operator without the use of additional tools. The pivot member 106 generally extends along the pivot-member axis 124.

The joint 110 connects the support member 102 and the pivot member 106. The joint 110 permits the pivot member 106 to pivot, or rotate, relative to the support member 102. When the pivot member 106 pivots, the pivot member rotation angle 126 between the support-member axis 122 and the pivot-member axis 124 may be varied.

The actuator 112 is configured to rotate the pivot member 106 about the joint 110. In some embodiments, the actuator 112 is a linear actuator, such as a position-sensing actuator or a hydraulic linear actuator, that extends between the support member 102 and the pivot member 106. An extension and a retraction of the linear actuator causes the pivot member 106 to pivot relative to the support member 102. In other embodiments, the actuator 112 is configured to exert a torque about the joint 110 to rotate the pivot member 106. In some embodiments, the actuator 112 is configured to rotate the pivot member 106 between approximately 80 degrees to 179 degrees of rotation, to vary the pivot member rotation angle 126. As depicted in FIG. 1, the pivot member rotation angle 126 is approximately 110 degrees.

In FIG. 1, the conveyor articulation joint 100 is depicted as having both a left side and a right side joined by the crossbar 118. Each of the left side and the right side may be substantially similar, and include a support member 102, a pivot member 106, and a joint 110 connecting the support member 102 and the pivot member 106. In such an embodiment, the conveyor articulation joint 100 includes at least one actuator 112, although certainly an actuator 112 may be on each of the left side and the right side to apply equal forces to each side of the conveyor articulation joint 100.

The conveyor articulation joint 100 further includes a conveyor lift actuator attachment point 128 and a safety wire attachment point 130. These attachment points 128, 130 are configured to receive a conveyor lift actuator and safety wires that are connected to the conveyor system of a planer machine 200.

FIG. 2 is a first side view of a planer machine having the conveyor articulation joint of FIG. 1. In particular, FIG. 2 depicts a side view of the planer machine 200 having the conveyor articulation joint 100 of FIG. 1. The planer machine 200 includes a front end 246 on the left side of the FIG. 1 which generally includes aspects of a secondary conveyor system 216 and a rear end 248 on the right side of FIG. 1 which generally includes aspects of the planing portion (e.g., a planing drum 212, a power source 222) of the planer machine 200 that cut, plane, or mill the road surface. The secondary conveyor system 216 is attached to the conveyor articulation joint 100 to connect the secondary conveyor system 216 to the frame 204 of the planer machine 200.

The frame 204 is supported by the ground engaging members 210. Vertical retraction members 228 are disposed between the frame 204 and the ground engaging members 210 to raise and lower the frame height 230, and thus the planing drum 212 out of and into a ground surface 202, respectively. As the planing drum 212 enters into the ground surface 202, the planing drum 212 rotates and creates debris as the ground surface 202 is removed. A primary conveyor system 214 within the frame 204 of the planer machine 200 receives the debris created during planing operations and discharges the debris to a proximal end 218 of the secondary conveyor system 216. The secondary conveyor system 216 continues to discharge the debris from the distal end 220. The debris is then generally collected in a bed of a transport vehicle (not depicted) after being discharged from the distal end 220 of the secondary conveyor system 216. The transport vehicle may be, for instance, an on-highway haul truck, an off-highway articulated or non-articulated truck, or any other type of transport vehicle known in the art.

A conveyor articulation joint 100 supports the proximal end 218 of the secondary conveyor system 216. In such an embodiment, the conveyor articulation joint 100 from FIG. 1 is attached to the frame 204 of the planer machine 200 and the pivot member 106 is attached to the secondary conveyor system at the conveyor attachment point 108.

The planer machine 200 further includes an operator station 206 that may include controls 208 such as steering devices and other controls to operate aspects of the planer machine 200. The steering devices may be realized as a joystick, buttons, or levers may be implemented. The controls 208 may be in wireless or wired communication with the controller 224 to receive commands. The controls permit advancing the planer machine 200 via the ground engaging members 210, operating the vertical retraction members 228 and planing drum 212, operating the actuators 112 of the conveyor articulation joint 100, and the like. A controller 224 may control the operations of the systems within the planer machine 200. The controller 224 may receive inputs from the operator station 206, via a remote operator, sensors throughout the planer machine 200 and the like. The planer machine 200 includes a power source 222 configured to operate the various systems of the planer machine 200. Example power sources include internal combustion engines, diesel engines, electric engines, and the like.

In some embodiments, the planer machine 200 includes a conveyor lift actuator 232 and a safety wire 234. The conveyor lift actuator 232 extends between the distal end 220 of the secondary conveyor system 216 and the conveyor lift actuator attachment point 128 on the conveyor articulation joint 100. Similarly, the safety wire 234 extends between the secondary conveyor system 216 and the safety wire attachment point 130 on the conveyor articulation joint 100. The conveyor lift actuator 232 applies a tension to adjust a position of the secondary conveyor system 216. As such, a secondary conveyor angle 240 between the secondary conveyor system 216 and the ground reference plane 244 may be adjusted by adjusting the tension of the conveyor lift actuator 232. A change in the secondary conveyor angle 240 that makes the secondary conveyor system 216 more parallel to the ground reference plane 244 lowers a distal-end height 238.

In some embodiments, the secondary conveyor system 216 includes an extensible support leg 242 disposed on the distal end 220 of the secondary conveyor system 216. The extensible support leg 242 is configured to extend between the ground surface 202 and the distal end 220 of the secondary conveyor system 216 to support the distal end 220 of the secondary conveyor system 216.

Further, the proximal end 218 of the secondary conveyor system 216 may also be supported directly or indirectly by the ground surface 202. The conveyor articulation joint 100 may be configured to rotate the pivot member 106 to lower the proximal end 218 of the secondary conveyor system 216 to a ground surface 202. The proximal end 218 of the secondary conveyor system 216 may also be supported by a brace or a stand that is placed on the ground surface rather than lowering the proximal end 218 of the secondary conveyor system 216 directly onto the ground surface 202.

In some embodiments, to support lowering the proximal end 218 of the secondary conveyor system 216 to the ground surface 202, the vertical retraction member 228 may be adjusted to change the height 230 of the frame 204 above the ground surface 202. This may be accomplished by fully retracting both a front and a rear vertical retraction member 228, or alternatively by extending a rear vertical retraction member 228 and retracting a front vertical retraction member 228 to impart an angle on the frame 204 of the planer machine 200. Operation of the vertical retraction members 228 may be in conjunction with operating the actuator 112 to lower the proximal-end height 236.

In some embodiments, the controller 224 is configured to receive machine operating parameters indicative of debris movement within the planer machine 200 and control the actuator 112 based on the machine operating parameters. As the actuator 112 extends and retracts, it causes the pivot member 106 to rotate about the joint 110 to change a proximal-end height 236 of the secondary conveyor system 216. The actuator 112 may be operated together with the conveyor lift actuator 232 to alter the proximal-end height 236, the distal-end height 238, and the secondary conveyor angle 240. These adjustments position the secondary conveyor system 216 relative to the primary conveyor system 214.

The parameters indicative of debris movement may include a speed of the planing drum 212, an advancement speed of the planer machine 200 based on the speed of the ground engaging member 210, a rate of change of height of the vertical retraction member 228, and the like. Further non-limiting examples of parameters indicative of debris movement include an advancement speed of the primary conveyor system 214, an angle of the primary conveyor system 214, and the like. These parameters indicative of debris movement may be received by the controller 224 and used to determine a desired position of the secondary conveyor system 216 relative to the primary conveyor system 214 to adequately receive the debris at the proximal end 218 of the secondary conveyor system 216.

In some embodiments, a debris sensor 226 is disposed in proximity to the proximal end 218 of the secondary conveyor system 216. The debris sensor 226 is configured to detect a location that the debris is received by the secondary conveyor system 216. The controller 224 receives data from the debris sensor 226 indicative of the location that the debris is received by the secondary conveyor system 216 and is configured to control the actuator 112 based on the detected location data from the debris sensor 226 to position the secondary conveyor system 216 relative to the primary conveyor system 214.

FIG. 3 is a is a second side view of a planer machine having the conveyor articulation joint of FIG. 1. In particular, FIG. 3 depicts the side view 300 of the planer machine 200. In the side view 300, the actuator 112 of the conveyor articulation joint 100 is in a retracted state as compared to that depicted in FIG. 2. The retraction of the actuator 112 causes the rotation of the pivot member 106 relative to the support member 102. As depicted in the view 300 of FIG. 3, the pivot member rotation angle is approximately 90 degrees. Here, the proximal-end height 236 is greater than the height depicted in FIG. 2. Further, the secondary conveyor angle 240 is also adjusted. Here, the secondary conveyor angle 240 is adjusted to be below the ground reference plane 244.

FIG. 4 is a third side view of a planer machine having the conveyor articulation joint of FIG. 1. In particular, FIG. 4 depicts the side view 400 of the planer machine 200. In the side view 400, the actuator 112 of the conveyor articulation joint 100 is in an extended state as compared to that depicted in FIG. 2. This extension of the actuator 112 rotates the pivot member 106 relative to the support member 102. As depicted in the view 400, the pivot member rotation angle 126 is approximately 170 degrees. Here, the proximal-end height 236 is less than the height depicted in FIG. 2. Further, the secondary conveyor angle 240 is also adjusted. Here, the secondary conveyor angle 240 is adjusted to be at a steeper angle than depicted in the FIG. 2.

Figure 5:
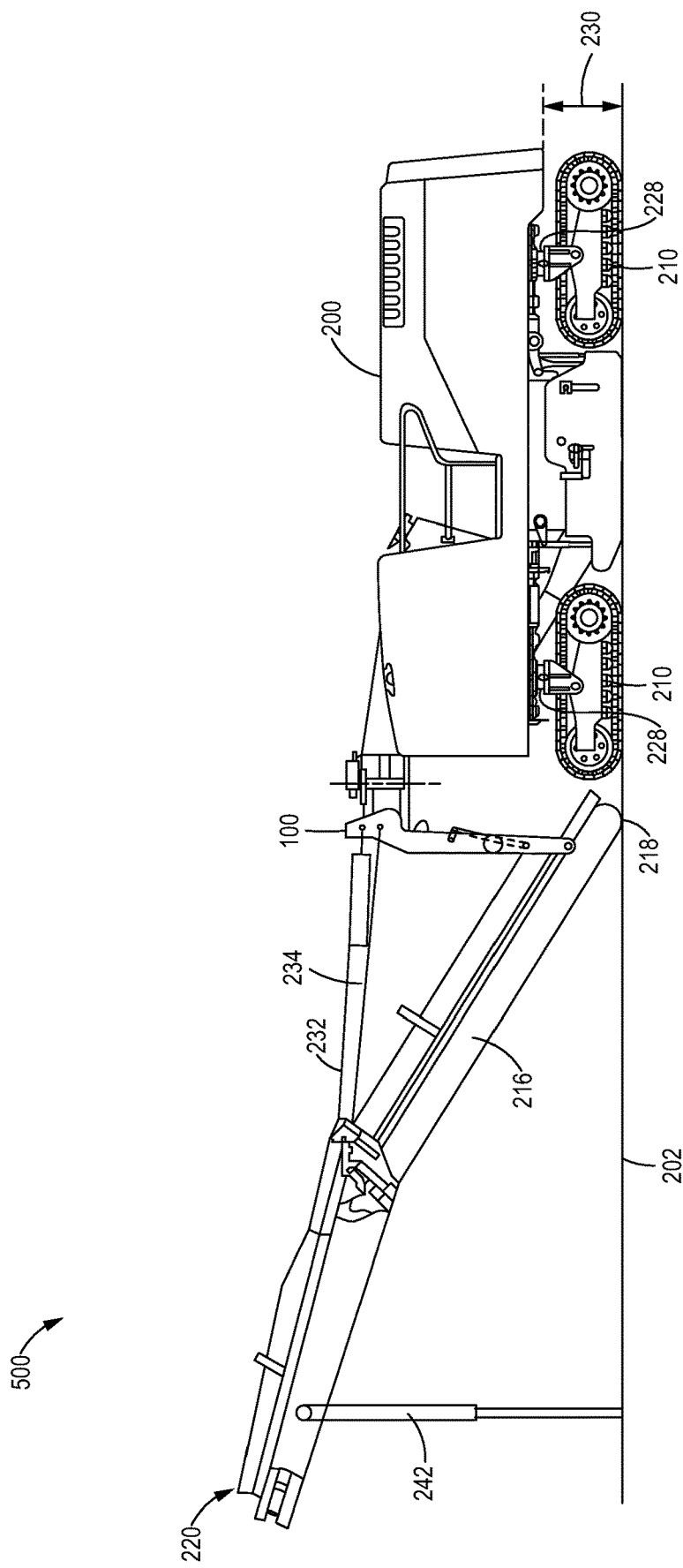
FIG. 5 is a fourth side view of a planer machine having the conveyor articulation joint of FIG. 1.

FIG. 5 is a fourth side view of a planer machine having the conveyor articulation joint of FIG. 1. In particular, FIG. 5 depicts the side view 500 having the extensible support leg 242 supporting the distal end 220 of the secondary conveyor system 216. Further, the proximal end 218 is lowered to the ground surface 202 by way of rotating the pivot member 106 by the actuator 112. The conveyor lift actuator 232 may be operated to change the height and angle of the secondary conveyor system 216 so that the extensible support legs 242 support the distal end 220 of the secondary conveyor system 216 and the proximal end 218 of the secondary conveyor system 216 is lowered to the ground surface 202. The vertical retraction member 228 may also be retracted to lower the frame height 230. In such a position as depicted in the view 500, with the distal end 220 and the proximal end 218 supported, the secondary conveyor system 216 may be disconnected from the conveyor articulation joint 100. In some embodiments, the amount of retraction available in the vertical retraction member 228 may be limited by the planing drum 212 interacting with the ground surface 202. As such, the proximal end 218 of the secondary conveyor system 216 may not be able to be lowered to the ground surface 202 as depicted in FIG. 5, even with the pivot member 106 being extending so that the pivot-member axis 124 is in line with the support-member axis 122. In such situations, the proximal end 218 of the secondary conveyor system 216 may instead be supported by a separate stand to permit engagement and disengagement of the secondary conveyor system 216 to and from the planer machine 200.

INDUSTRIAL APPLICABILITY

In operation, the disclosed conveyor articulation joint systems and methods may be used with various industries including road material or asphalt removal systems, in particular those of a cold planer machine, in addition to altering a position of the secondary conveyor system 216 with respect to the primary conveyor system 214, the conveyor articulation joint 100 may further be used to load and unload (attach and detach) the secondary conveyor system 16 from the remainder of the planer machine 200. The FIGS. 1-5 are used in conjunction with the methods depicted in FIGS. 6-8 by way of example to disclose the operations of the conveyor articulation joint 100.

FIG. 6 is a flowchart of a first method of disconnecting a secondary conveyor system from a planer machine, according to one or more embodiments of the present disclosure. In particular, FIG. 6 depicts the method 600 that includes lowering the distal end of the secondary conveyor system at block 602, supporting the distal end of the secondary conveyor system at block 604, lowering a proximal end of the secondary conveyor system at block 606, and disconnecting the secondary conveyor system from the planer machine at block 608.

Initially, the planer machine 200 may be as depicted in FIG. 2, having the secondary conveyor system 216 attached to the planer machine 200. At block 602, the distal end of 220 of the secondary conveyor system 216 may be lowered by extending the conveyor lift actuator 232, which is attached between the conveyor lift actuator attachment point 128 on the support member 102 and the distal end 220 of the secondary conveyor system 216.

At block 604, the distal end 220 of the secondary conveyor system 216 is supported. The distal end 220 may be supported by a separate brace or stand (not depicted), in some embodiments, an extensible support leg 242 may be used to support the distal end 220 of the secondary conveyor system 216. Such an example is depicted in part in the side view 500 of FIG. 5, showing the extensible support leg 242 supporting the distal end 220 of the secondary conveyor system 216. The extensible support, leg 242 is rotated from being parallel with the secondary conveyor system 216 to being perpendicular with the ground surface 202. Further, the extensible support leg 242 is in an extended state equal to the distal-end height 238.

At block 606, the proximal end 218 of the secondary conveyor system 216 is lowered by the conveyor articulation joint 100. The lowering is based at least in part on the actuator 112 causing the pivot member 106 to rotate about the joint 110 relative to the support member 102. The proximal end 218 is lowered to the ground surface 202 or a separate brace or stand. The lowering may further be based on operating the vertical retraction member 228 to change the frame height 230.

At block 608, the secondary conveyor system 216 is disconnected from the planer machine. With the secondary conveyor system 216 supported (e.g., at the distal end 220 and the proximal end 218), it is able to be removed from the planer machine 200. The secondary conveyor system 216 may then be serviced, repaired, inspected, loaded onto a different planer machine, or the like. In some embodiments, disconnecting the secondary conveyor system 216 from the planer machine 200 is done via quick disconnects that may be operated by hand without additional tools. The conveyor lift actuator 232 and the safety wire 234 may also be disconnected from either one or both of the secondary conveyor system 216 and the conveyor articulation joint 100.

The method 600 may be reversed to install a secondary conveyor system 216 onto a planer machine 200. In such an embodiment, the planer machine 200 is positioned adjacent to the supported secondary conveyor system 216. The conveyor articulation joint 100 of the planer machine 200 is operated to rotate the pivot member 106 to be in proximity with the secondary conveyor system 216. An operator then connects the secondary conveyor system 216 to the conveyor attachment point 108 on the pivot member 106. The conveyor lift actuator 232 and the safety wire 234 may also be connected between the secondary conveyor system 216 and the conveyor articulation joint 100. The proximal end 218 and the distal end 220 may then be raised to operate the planer machine 200 with the secondary conveyor system 216 attached.

FIG. 7 is a flowchart of a second method of operating a planer machine with a conveyor articulation joint, according to one or more embodiments of the present disclosure. In particular, FIG. 7 depicts the method 700 that includes milling the ground surface at block 700, monitoring machine operating parameters at block 704, rotating the pivot member based on the machine operating parameters at block 706, and adjusting the lift actuator based on the machine operating parameters at block 708.

The method 700 may be used by a cold planer, such as the planer machine 200 of FIG. 2, to position the secondary conveyor system 216 in proximity to the primary conveyor system 214. As discussed above, the controller 224 may be configured to receive machine operating parameters indicative of debris movement within the planer machine 200. These operating parameters are indicative of the milling of the road surface, and the discharge of the road debris from the primary conveyor system 214 to the proximal end 218 of the secondary conveyor system 216.

At blocks 706 and 708, the pivot member 106 may be rotated by way of the actuator 112, and the conveyor lift actuator 232 may be adjusted, respectively, based on the machine parameters monitored at block 704. As such, the distal-end height 238, the proximal-end height 236, and the secondary conveyor angle 240 may be adjusted to position the secondary conveyor system 216 relative to the primary conveyor system 214.

In some embodiments, the secondary conveyor system 216 is able to be positioned relative to the primary conveyor system 214 in manual mode. For example, the operator station 206, or any other convenient location, may include controls to operate the actuator 112 and the conveyor lift actuator 232. Thus, an operator is able to position the secondary conveyor system 216 in order to perform inspections, maintenance, and the like in the vicinity of the proximal end 218 of the secondary conveyor system 216 when the secondary conveyor system 216 is spaced apart from the conveyor articulation joint 100.

FIG. 8 is a flowchart of a third method of, according to one or more embodiments of the present disclosure. In particular, FIG. 8 depicts the method 800 that includes milling a ground surface at block 802, detecting a debris location on the proximal end of the secondary conveyor system at block 804, rotating a pivot member based on the detected debris location at block 806, and adjusting the conveyor lift actuator 232 based on the detected debris location at block 808.

The method 800 is similar to that of the method 700, but instead of monitoring the machine parameters indicative of the milling operation, a debris sensor is used to determine the location that the debris is being received at the proximal end 218 of the secondary conveyor system 216. In such an embodiment disclosed by the method 700, a planer machine 200 includes a debris sensor 226 disposed at the proximal end of the secondary conveyor system 216. The debris sensor 226 is configured to detect a location that the debris is received by the secondary conveyor system 216. The controller 224 is configured to control the actuator 112 based on the detected location that the debris is received by the secondary conveyor system (block 806). The controller 224 may further adjust a conveyor lift actuator 232 based on the detected debris location.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof

What is claimed is:

1. A conveyor articulation joint comprising:
   a support member affixed to a machine attachment point, the machine attachment point is configured to rotate the conveyor articulation joint about a vertical axis to rotate a conveyor;
   a pivot member having a conveyor attachment point at one end and connected to the support member at an opposite end;
   a joint connecting the support member and the pivot member; and
   an actuator configured to rotate the pivot member about the joint.

2. The conveyor articulation joint of claim 1, wherein the machine attachment point is configured to maintain the support member at a fixed angle with respect to an upright surface of a planer machine when the conveyor articulation joint is attached to the planer machine.

3. The conveyor articulation joint of claim 1, wherein the conveyor attachment point is configured to be a quick disconnect attachment mechanism.

4. The conveyor articulation joint of claim 1, wherein the actuator is a linear actuator extending between the support member and the pivot member.

5. The conveyor articulation joint of claim 4, wherein the actuator is a hydraulic linear actuator.

6. The conveyor articulation joint of claim 4, wherein the actuator is a position-sensing actuator.

7. The conveyor articulation joint of claim 1, wherein the actuator is configured to exert a torque about the joint to rotate the pivot member.

8. The conveyor articulation joint of claim 1, wherein the actuator is configured to rotate the pivot member through a rotation angle that is between 80 to 179 degrees of rotation.

9. A planer machine having:
   a primary conveyor system to receive debris from a planing drum;
   a secondary conveyor system to receive, at a proximal end, the debris from the primary conveyor system and to discharge the debris from a distal end;
   a conveyor articulation joint to support the proximal end of the secondary conveyor system, the conveyor articulation joint having:
   a support member attached to a frame of the planer machine at a machine attachment point;
   a pivot member attached to the secondary conveyor system at a conveyor attachment point at one end and connected to the support member at an opposite end;
   a joint connecting the support member and the pivot member; and
   an actuator configured to pivot the pivot member about the joint to change a proximal-end height of the secondary conveyor system.

10. The planer machine of claim 9, further comprising a controller configured to:
    receive machine operating parameters indicative of debris movement within the planer machine; and
    control the actuator based on the received machine operating parameters.

11. The planer machine of claim 10, wherein the machine operating parameters indicative of debris movement within the planer machine include at least one of a speed of the planing drum, an advancement speed of the primary conveyor system, and an angle of the primary conveyor system.

12. The planer machine of claim 9, further comprising:
    a debris sensor disposed at the proximal end of the secondary conveyor system, the debris sensor configured to detect a location that the debris is received by the secondary conveyor system; and
    a controller configured to control the actuator based on the detected location of the debris received by the secondary conveyor system.

13. The planer machine of claim 9, wherein the conveyor articulation joint is configured to rotate the pivot member to lower the proximal end of the secondary conveyor system to a ground surface.

14. The planer machine of claim 9, further comprising a vertical retraction member disposed between a ground engaging member and the frame of the planer machine, the vertical retraction member configured to change a frame height (230) of the planer machine, wherein the proximal end of the secondary conveyor system is configured to be lowered to a ground surface based at least in part on the pivot member rotating to lower the proximal end of the secondary conveyor system and a retraction of the vertical retraction member to lower the frame height of the planer machine.

15. The planer machine of claim 9, further comprising a conveyor lift actuator attached between a conveyor lift actuator attachment point on the support member and the distal end of the secondary conveyor system, wherein the conveyor lift actuator is configured to change a distal-end height of the secondary conveyor system.

16. The planer machine of claim 9, further comprising an extensible support leg disposed on the distal end of the secondary conveyor system, the extensible support leg being configured to extend between a ground surface and the distal end of the secondary conveyor system to support the distal end of the secondary conveyor system.

17. A method of detaching a conveyor system from a planer machine, the method comprising:
    supporting a distal end of the conveyor system;
    lowering a proximal end of the conveyor system by a conveyor articulation joint, the conveyor articulation joint having a support member, a pivot member, a joint connecting the support member and the pivot member, and an actuator, wherein the lowering is based at least in part on the actuator causing the pivot member to rotate about the joint; and
    disconnecting the conveyor system from the planer machine.

18. The method of claim 17, wherein:

the planer machine comprises a conveyor lift actuator attached between a lift actuator attachment point on the support member and the distal end of the conveyor system; and the method further comprises the conveyor lift actuator lowering the distal end of the conveyor system.

19. The method of claim 18, wherein:

the distal end of the conveyor system comprises an extensible support leg, the extensible support leg being configured to extend between a ground surface and the distal end of the conveyor system; and supporting the distal end of the conveyor system comprises extending the extensible support leg.

* * * * *